United States Patent
Ursell et al.

(10) Patent No.: US 9,815,177 B2
(45) Date of Patent: Nov. 14, 2017

(54) STRAIGHT EDGE CLAMP

(71) Applicants: Michael Ursell, Bloomfield Hills, MI (US); Garry Favel, Kibbutz Kadarim (IL); Tsvi Hershkovich, Karmiel (IL)

(72) Inventors: Michael Ursell, Bloomfield Hills, MI (US); Garry Favel, Kibbutz Kadarim (IL); Tsvi Hershkovich, Karmiel (IL)

(73) Assignee: AFFINITY TOOL WORKS, LLC, Troy, MI (US)

( * ) Notice: Subject to any disclaimer, the term of this patent is extended or adjusted under 35 U.S.C. 154(b) by 0 days.

(21) Appl. No.: 14/629,677

(22) Filed: Feb. 24, 2015

(65) Prior Publication Data

US 2015/0283679 A1  Oct. 8, 2015

Related U.S. Application Data

(63) Continuation-in-part of application No. 14/243,935, filed on Apr. 3, 2014.

(51) Int. Cl.
| | |
|---|---|
| *B25B 5/00* | (2006.01) |
| *B25B 5/16* | (2006.01) |
| *B25B 5/02* | (2006.01) |
| *B25B 5/08* | (2006.01) |
| *B25B 1/08* | (2006.01) |
| *B25B 1/24* | (2006.01) |
| *F16B 2/12* | (2006.01) |
| *F16B 2/18* | (2006.01) |

(52) U.S. Cl.
CPC .............. *B25B 5/166* (2013.01); *B25B 1/08* (2013.01); *B25B 1/2489* (2013.01); *B25B 5/02* (2013.01); *B25B 5/085* (2013.01); *F16B 2/12* (2013.01); *F16B 2/18* (2013.01)

(58) Field of Classification Search
CPC .. B25B 5/08; B25B 5/16; B25B 5/163; B25B 5/166; B25B 1/2489; B25B 1/2457; B25B 5/085; B25B 1/0078; B25B 5/068
USPC ........................................................ 269/149
See application file for complete search history.

(56) References Cited

U.S. PATENT DOCUMENTS

| 891,080 A | * | 6/1908 | Krogh | ....................... B25B 5/08 144/307 |
|---|---|---|---|---|
| 2,607,124 A | * | 8/1952 | Dery | ....................... G01B 3/303 33/567.1 |
| 3,406,958 A | * | 10/1968 | Geneloni | ................... B25B 5/08 269/137 |
| 3,815,894 A | * | 6/1974 | Olson | ....................... B25B 1/12 269/167 |
| 4,170,345 A | * | 10/1979 | Townsend | ................. B25B 1/02 269/203 |
| 4,394,800 A | * | 7/1983 | Griset | ................... B23B 47/287 33/32.3 |
| 4,499,667 A | * | 2/1985 | Griset | ................... B23B 47/287 33/437 |

(Continued)

*Primary Examiner* — Larry E Waggle, Jr.
*Assistant Examiner* — Tyrone V Hall, Jr.
(74) *Attorney, Agent, or Firm* — William H. Honaker; Dickinson Wright PLLC

(57) ABSTRACT

The present invention relates to a straight edge clamp that has a clamping head assembly and an end stop mounted upon the body of the straight edge. The clamping head assembly has a locking assembly that allows it to be locked to the straight edge. The straight edge clamp body can include sections that are adapted to be connected together to form the overall length of the straight edge clamp.

15 Claims, 4 Drawing Sheets

(56) References Cited

U.S. PATENT DOCUMENTS

| | | | | |
|---|---|---|---|---|
| 4,516,874 A * | 5/1985 | Yang | ............ | F16B 5/126 403/313 |
| 4,741,387 A * | 5/1988 | Strong | ............ | B27B 25/10 83/421 |
| 4,989,654 A * | 2/1991 | Berkeley | ............ | B23Q 3/103 144/1.1 |
| 5,348,276 A * | 9/1994 | Blacker | ............ | B25B 1/08 269/152 |
| 5,573,230 A * | 11/1996 | Lambertini | ............ | B25B 5/08 269/235 |
| 5,768,966 A * | 6/1998 | Duginske | ............ | B27B 25/10 144/253.1 |
| 5,964,041 A * | 10/1999 | Daniel | ............ | B23Q 9/0042 33/403 |
| 6,622,997 B2 * | 9/2003 | Emerson | ............ | B25B 1/08 269/164 |
| 6,665,947 B2 * | 12/2003 | Kirkland | ............ | B23Q 9/0042 33/613 |
| 7,165,334 B2 * | 1/2007 | Ben-Gigi | ............ | B25H 7/00 33/443 |
| 7,484,306 B2 * | 2/2009 | Emerson | ............ | B25B 1/2489 33/403 |
| 7,631,847 B2 * | 12/2009 | Harrison | ............ | B25H 1/04 248/229.1 |
| 8,177,209 B2 * | 5/2012 | Chen | ............ | B25B 1/08 269/143 |
| 8,230,611 B1 * | 7/2012 | Emerson | ............ | B23Q 9/0042 33/403 |
| 9,067,306 B1 * | 6/2015 | Lee | ............ | B25B 1/24 |
| 2003/0233925 A1 * | 12/2003 | Makropoulos | ............ | B23D 47/02 83/829 |
| 2006/0272744 A1 * | 12/2006 | Liu | ............ | B25H 1/06 144/286.5 |

\* cited by examiner

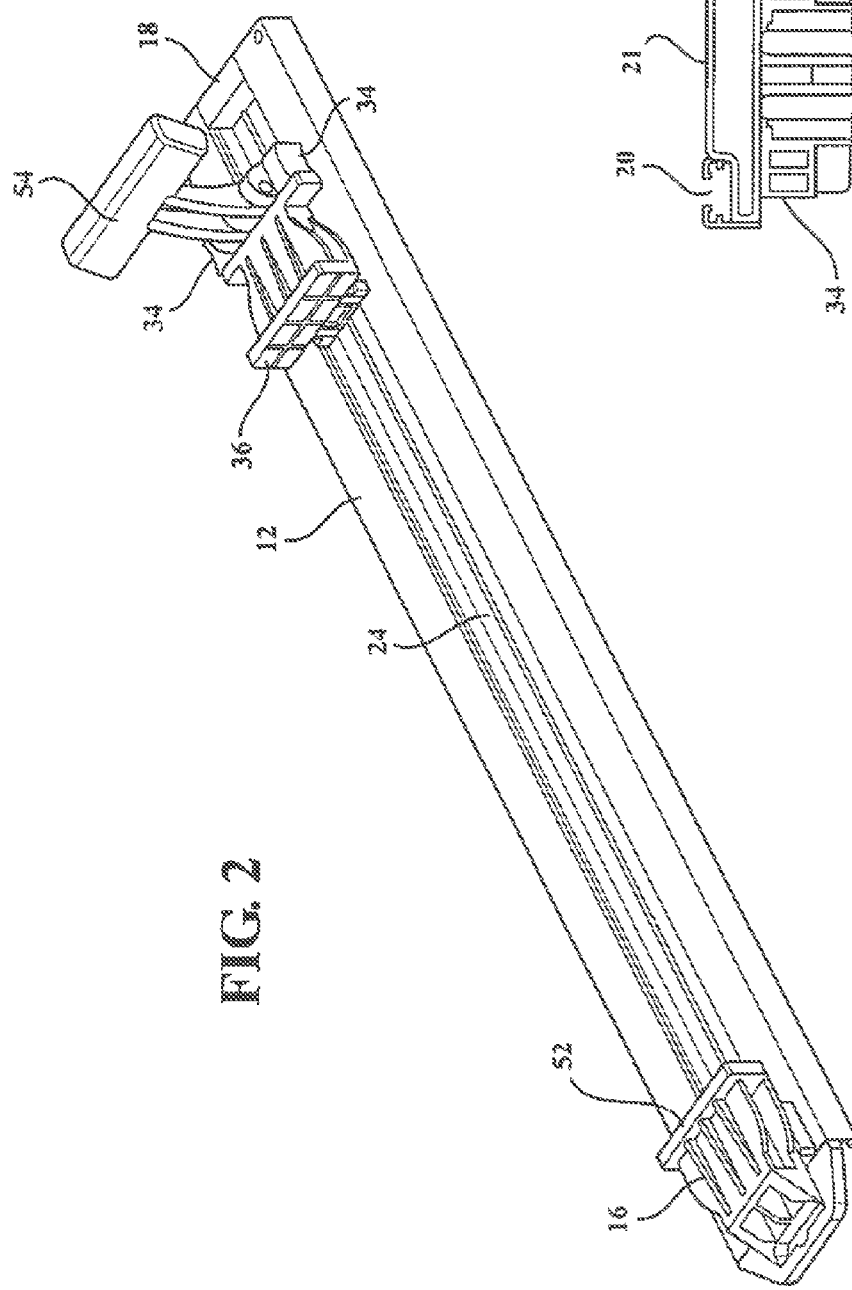
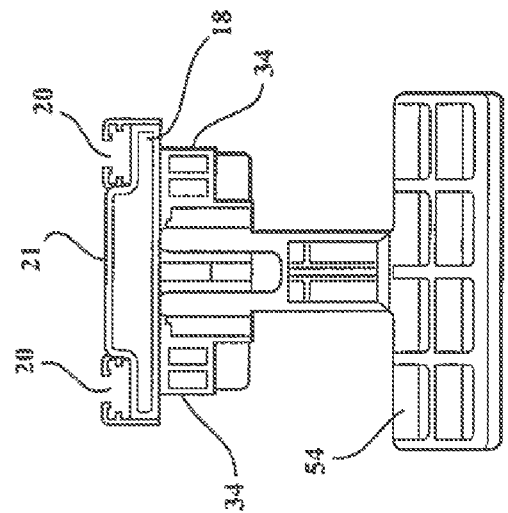

STRAIGHT EDGE CLAMP

RELATED APPLICATIONS

This application is a Continuation-In-Part and claims the benefit of U.S. patent application Ser. No. 14/243,935 filed on filed on Apr. 3, 2014.

STATEMENT REGARDING FEDERALLY SPONSORED RESEARCH

NONE

TECHNICAL FIELD

This invention relates generally to a straight edge clamp and, more particularly, a straight edge clamp with a unique clamping system which reduces weight and costs and allows easier operation of the clamp from the head of the clamp. The clamping operation is easier since the clamping operation can be performed entirely at the head of the clamp. In a further embodiment, the straight edge clamp of the present invention also has a unique connector and sections that allow a number of sections to be connected together to form a straight edge clamp of any desired length.

BACKGROUND

Straight edge clamps are well none for use in making straight cuts with for example a circular saw, of for guiding a router on materials, such as wood, aluminum plastic, etc. Straight edge clamps provide a straight edge secured to a work piece or work pieces so that a power tool or a guide for a power tool can be moved along the straight edge, for example, to form a cut edge with a circular hand saw or to form a trimmed edge with a hand router. Also, straight edge clamps are used for the purpose of holding accessory tool against a work piece, for example, to form pocket holes.

U.S. Pat. No. 6,622,997 discloses a typical straight edge clamp. The straight edge clamp disclosed in the '997 patent includes a straight edge that is made of extruded aluminum and has an open channel, a fixed stop, a sliding stop that is received in the channel and can slide along the straight edge, and a bar or rod clamp that connects the sliding stop to the fixed stop. The bar extends the length of the straight edge.

The sliding stop has a body that is inserted in the channel of the straight edge, and a jaw that protrudes from the body and out of the channel to secure a work piece. The rod and interaction of the sliding stop perform the clamping function. In the locked state, the second stop can move toward the first stop since the body pushes the locking elements, a series of plates mounted on the rod. near the center of the rod and the pushing force is applied uniformly around the hole, and the locking elements can slide along the rod. However, moving in reverse direction is blocked since the slider pushes the ends of the locking element and the pushing force is applied at a point offset from the center of the holes and the rod, thereby locking the holes on the rod.

The main problem with known straight edge clamps is the need for the rod extending the length of the straight edge. The rod and the locking elements increase the cost of the clamp and the weight. They also limit the length of the clamp. The clamp has a predetermined length that cannot be adjusted. The clamp length cannot be changed.

SUMMARY OF THE INVENTION

In general terms, this invention provides a straight edge clamp and, more particularly, a straight edge clamp that has a unique clamping system at one end of the straight edge. All clamping movements are controlled at a single end of the clamp which reduces the cost of the clamp and greatly simplifies operation of the clamp. The straight edge clamp of the present invention has a unique clamping system that doesn't require the rod or locking elements of known straight edge clamps.

In a further embodiment, the straight edge clamp of the present invention also permits the length of the straight edge to be easily changed by the attachment or removal of sections. The straight edge clamp of the present invention includes an elongated body, a clamping head assembly and an end stop. The elongated body includes a single section or if desired two or more sections and a connector for connecting the sections to form the elongated body. It should be appreciated by those of ordinary skill in the art that the number of sections that are connected together determines the length of the straight edge clamp. Any number of sections can be connected together; additionally, a single section can be used due to the unique clamping system and end stop.

The length of the sections in the disclosed embodiment are each approximately two feet in length and can be attached to form two, four, six, eight, ten, twelve foot, etc., straight edge clamps. The section lengths can be any other length if desired. This is a benefit since it allows a user to purchase the number of sections to form the desired length of the straight edge clamp. This also alleviates the need for the user to have a number of straight edge clamps for different jobs as is required with conventional straight edge clamps. With the straight edge clamp of the present invention, the user merely attaches the sections together to obtain the desired length.

Another benefit of the sections is the straight edge clamp of the present invention is easier and less costly to ship than conventional straight edge clamps since it can be packaged in a small package, the general size of the sections.

A still further benefit of the sections is that it is easier to display at the point of purchase when compared to conventional straight edge clamps. With the straight edge clamp of the present invention, the sections can be displayed with the clamping head assembly, the end stop and if desired the end cap.

The elongated body has opposed edges, a top and a bottom. A main channel is formed in the bottom. The connector can be inserted into the main channel of adjoining sections to form any desired length. The clamping head assembly and the end stop are mounted within the main channel a spaced distance from one another. The clamping head assembly has a movable jaw that is movable in the direction of the end stop, from a released position to a clamped position. The end stop of the present invention can be fixed to a section, or in an alternative embodiment may be moved along the section and locked into place with engagement surfaces or pads when clamped. In the alternative embodiment, the end stop includes a moveable jaw and engagement surfaces, or pads, like those of the clamping head assembly, with the moveable jaw moving away from the clamping head assembly to engage the pads and lock the end stop.

In the disclosed embodiment, the head assembly or the end stop can be removed and repositioned in the channel of the section that is furthest away from either the clamping head assembly or the end stop. The ability to move the head assembly or the end stop to the last section, allows any number of sections to be attached to form a straight edge of desired length. The clamping head assembly and the end stop are not connected together allowing them to be moved independently of one another.

In use, the bottom of the elongated body is adapted to be positioned against a work surface. The work surface has sides and the clamping head assembly and end stop are adapted to be positioned against the sides. Once positioned, the head clamping assembly is moved to the clamped position or in the alternative embodiment, both the head clamping assembly and end stop are moved to the clamping position.

The head clamping assembly can be mounted in a fixed position to the elongated body or it can be moved along the elongated body. The head clamping assembly has a lock mechanism that is moved from the unlocked to the locked position. The locking mechanism includes engagement surfaces or pads to engage the sidewalls of the channel. An advantage of this embodiment is that a single, very simple engagement member can be used.

These and other features and advantages of this invention will become more apparent to those skilled in the art from the detailed description of a preferred embodiment. The drawings that accompany the detailed description are described below.

BRIEF DESCRIPTION OF THE DRAWINGS

FIG. 2 is a perspective view of the straight edge clamp of the present invention clamped to a surface;

FIG. 4 is an end view of the straight edge clamp of the present invention;

DETAILED DESCRIPTION OF A PREFERRED EMBODIMENT

Figure 1:
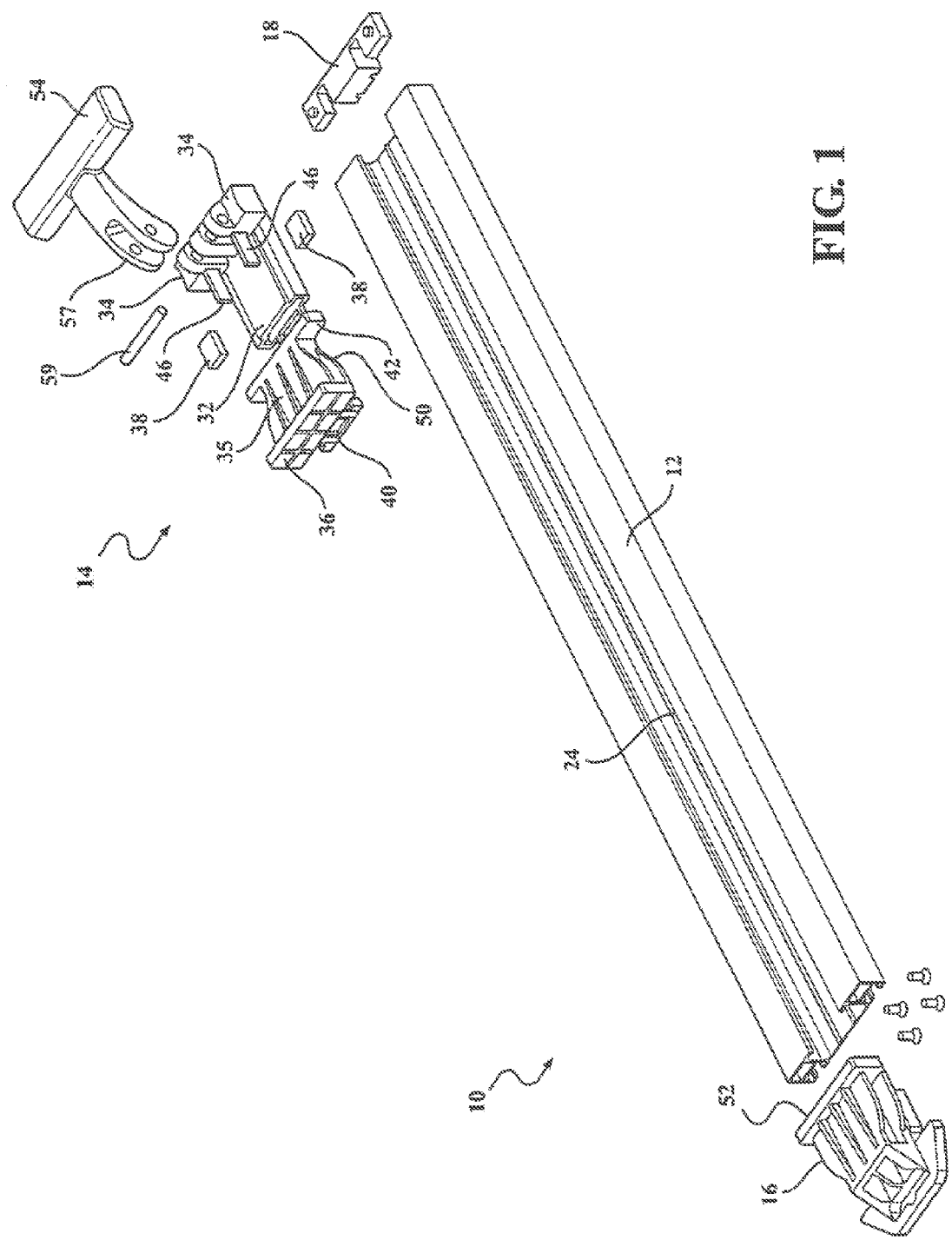
FIG. 1 is an exploded view of the underside of the straight edge clamp of the present invention.

With reference to FIGS. 1 through 4, the straight edge clamp of the present invention is shown generally at 10. The straight edge clamp 10 includes an elongated body 12, a clamping head assembly 14 and an end stop 16. An end cap 18 is provided in the disclosed embodiment to close the end of the straight edge clamp 10.

Figure 6:
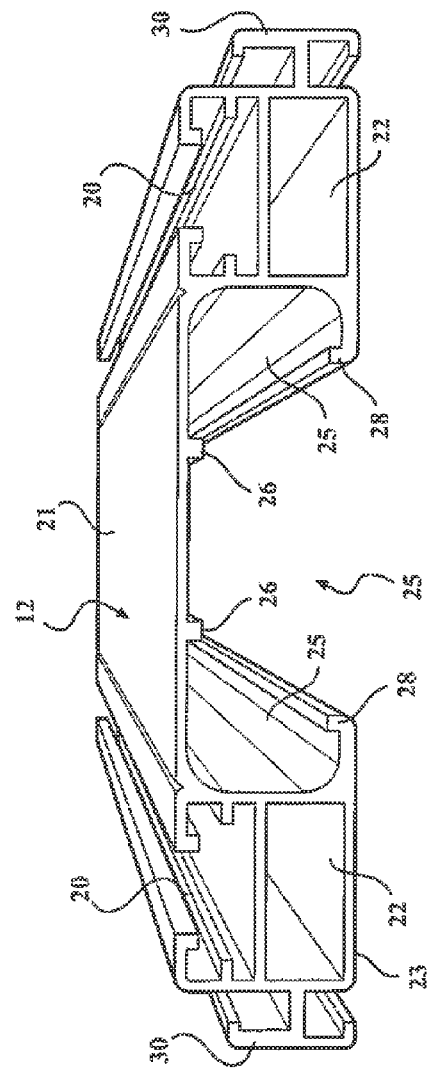
FIG. 6 is an end view of the elongated body of the present invention.
Figure 5:
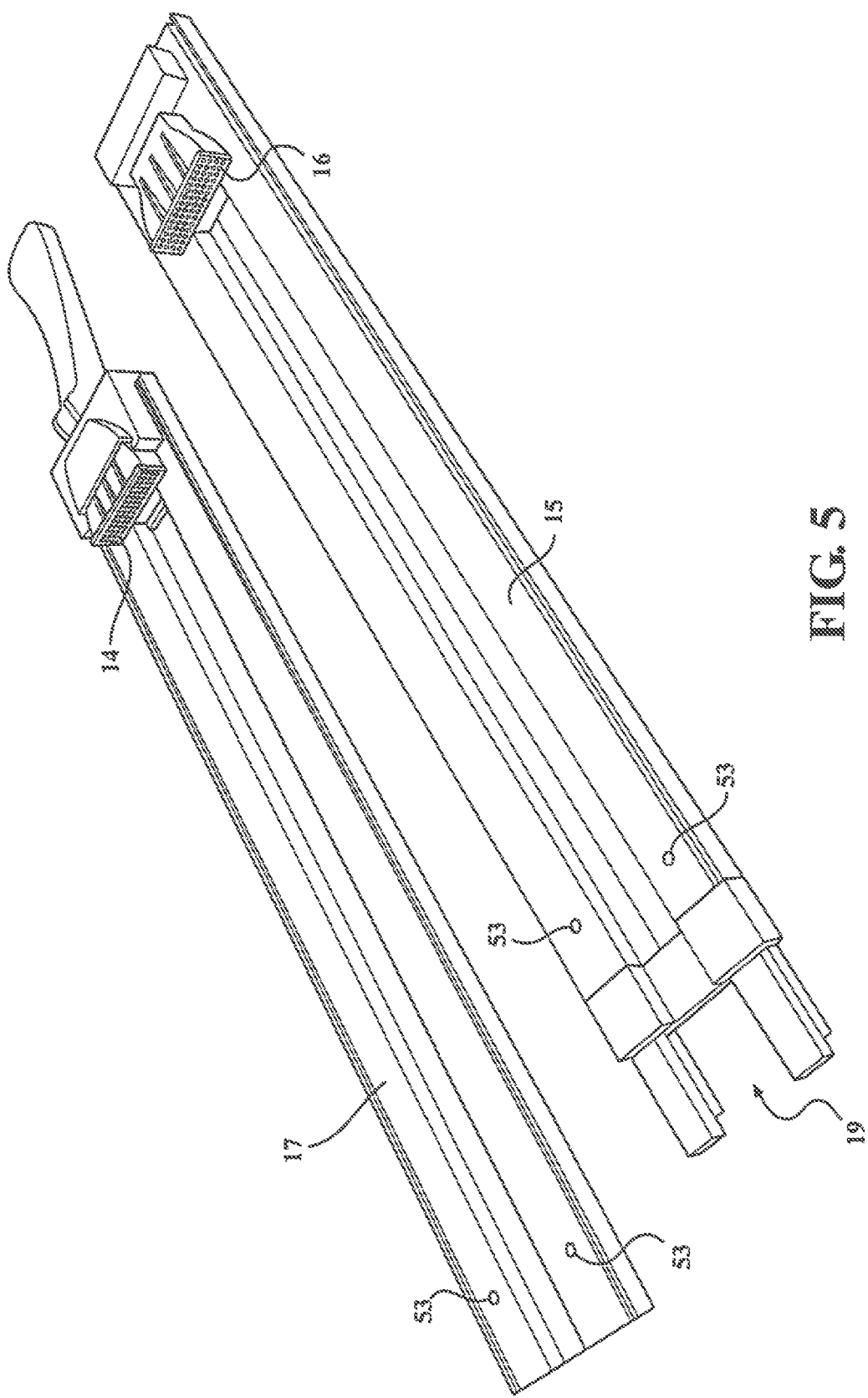
FIG. 5 is a perspective view of two section of the straight edge clamp of the present invention.

With reference to FIGS. 5 and 6, the elongated body 12 includes at least two sections 15 and 17 and a connector 19 for connecting the sections 15 and 17 together to form the elongated body 12. It will be appreciated by those of ordinary skill in the art that the number of sections 15 and 17 that are connected together will determine the length of the straight edge clamp 10. By way of example, the sections in the disclosed embodiment are each approximately two feet in length and can be attached to form two, four, six, eight, ten, twelve foot etc. straight edge clamps. This allows a user to purchase the number of sections 15 and 17 to form the desired length straight edge clamp 10. This also alleviates the need for the user to have a number of straight edge clamps for different jobs. With the straight edge clamp 10 of the present invention, the user merely attaches the sections 15 and 17 to obtain the desired length. It should be appreciated by those of ordinary skill in the art that other section lengths can be used, for example 6 inches, 1 foot, 2 foot, etc.

With reference to FIG. 6, the profile of the elongated body 12 is shown. The elongated body 12 includes a top surface 21 and a bottom surface 23. The bottom surface 23 has spaced openings 22 adjoining a generally c-shaped central channel 24. In the disclosed embodiment, the central channel 24 has protrusions 26 and locator rails 28 protruding into the channel 24. There are also optional outer attachment ribs 30 and attachment grooves 20. These can be used to attach other items to the straight edge clamp 10.

With reference to FIG. 1, the head clamping assembly 14 will be described in greater detail. The assembly 14 has a base 32 that slides into and along the channel 24. There is a hand grip 34 on the base that facilitates the movement of the assembly 14 along the channel 24. In the alternative, the head clamping assembly could be fixed to the elongated body 12 by screws, bolts, glue, press fit etc. A first jaw 36 is movably mounted upon the base 32 and can be moved from a released position to a locked position. Clamp pads 38 are mounted within the base 32 and are forced outwardly by the movement of the first jaw 36 to the locked position. The clamp pads 38 engage the sidewalls 25 (see FIG. 6) when the clamping assembly 14 is in the locked position. The first jaw 36 has limit tabs 40 that engage limit tabs 42 on the base 32. The limit tabs 42 restrict the movement of the first jaw 36 within the base 32.

The base 32 includes a passage 35 that receives an actuation member 50 extending from the first jaw 36. The actuation member 50 has sides that engage the clamp pads 38 and force them to the locked position when the actuation member 50 is forced into the passage 35. The actuation member 50 or the clamp pads 38 are angled so that they are cam outwardly into engagement with the sides 25 of the channel 24. In the disclosed embodiment, the pads 38 have angled sides. But, it will be understood by those of ordinary skill in the art that the actuation member 50 could have angled sides. The actuation member is moved along the passage 35 and against the clamp pads 38, when the clamping head assembly 14 is engaged, as will be described in greater detail below. It should be appreciated by those of ordinary skill the art that the actuation member 50 or a single pad 38 could have a single side extending at an acute angle to the longitudinal center line of the straight edge body 12 and that only one clamp pad 38 would be needed.

Guide fingers 46 extend out of the base 32 and into guide finger pockets in the first jaw 36 (not shown). The fingers 46 in the first pockets align the first jaw 36 and facilitate its movement with respect to base 32. A second pocket 55 can also be provided to receive a spring to bias the first jaw 36 to the released position.

With reference to FIGS. 1 to 4, the clamping head assembly 14 will be described. The clamping head assembly 14 is fitted into the end of one of the sections 15, 17 of the elongated straight edge body 12.

The clamping head assembly includes a clamp actuation handle 54. A second jaw 52 extends from the end stop 16. The handle 54 includes a cam member 57 that engages and pushes the jaw 36 in to the direction of the end stop 16 when the handle 54 is rotated. The handle 54 is pivotally mounted to the base 32 by a pin 59 for rotation with respect to the elongated body 12. The clamp actuation handle 54 is shown as a rotatable handle, but could also be a handle that slides in the direction of the end stop 16, a handle that rotates in a plane parallel to the elongated body 12, etc. It will be understood by those of ordinary skill in the art that the form of the actuation handle 54 is not critical, any means to move the jaw 36 in the direction of the end stop 16 will work and is in the scope of the present invention.

Figure 3:
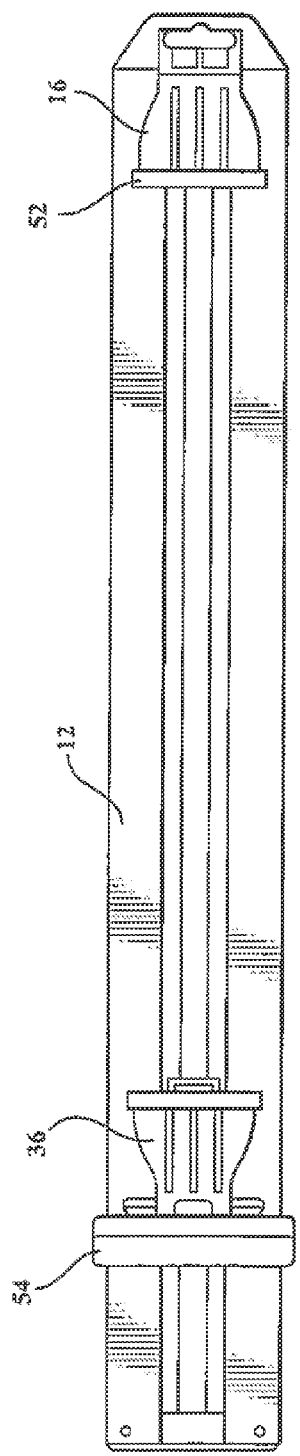
FIG. 3 is a bottom view of the straight edge clamp of the present invention.

In use, the bottom surface 23 of the elongated body 12 is positioned against a work surface, (see FIGS. 2 through 4). The work surface has sides and the clamping head assembly 14 and end stop 16 are adapted to be positioned against the sides. The second jaw 52 is positioned against one side of the work surface and the head clamp assembly 14 is moved through the handle 54 to engage the first jaw 36 against the side of the work surface. Rotation of the handle 54 to the clamped position moves the first jaw into the clamped position. Movement of the first jaw 36 also moves the pads 38 against the sides 25 of the elongated body 12 locking the jaws 36 and 52 against the sides of the work surface and the sides 25 of the elongated straight edge body 12. As a result, the straight edge clamp is locked onto the work surface. In a further embodiment, the sides 25 are serrated to provide additional locking resistance.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A straight edge clamp comprising:
   an elongated body, said elongated body including at least two sections, and at least one connector for connecting said sections to form a unitary elongated body; an overall length of said elongated body is determined by a number of sections attached together by said at least one connector; said elongated body has opposed edges, a top and a bottom, and a main channel formed in said bottom,
   a clamping head and an end stop, said clamping head is mounted within said main channel a spaced distance from said end stop;
   said clamping head includes a locking mechanism to lock said clamping head with respect to said elongated body, said locking mechanism of said clamping head includes a movable locking member that moves between a locked and unlocked position; said movable locking member has engagement surfaces adapted to engage the elongated body; said main channel has sidewalls, said engagement surfaces engage said sidewalls in said locked position;
   whereby said bottom of said elongated body is adapted to be positioned against a work surface having sides and said clamping head is adapted to be positioned against one of the sides, and said locking mechanism is moved to a clamped position.

2. The straight edge clamp of claim 1, wherein said locking mechanism of said clamping head has a movable first jaw that is movable in a direction toward said end stop, between a released position and a locked position.

3. The straight edge clamp of claim 2, wherein said clamping head includes at least one clamp pad mounted adjacent said first jaw, said first jaw being moveable with respect to said at least one clamp pad to move said at least one clamp pad into engagement with said elongated body to said locked position.

4. The straight edge of claim 3, wherein said first jaw being moveable with respect to said at least one clamp pad into engagement with at least one of said sidewalls to said locked position.

5. The straight edge clamp of claim 4, wherein said at least one clamp pad includes at least one side wall extending at an acute angle with respect to a longitudinal center line of said elongated body.

6. The straight edge clamp of claim 5, further including a pair of clamp pads mounted adjacent said first jaw, said first jaw being moveable with respect to said clamp pads to move said clamp pads into engagement with said elongated body to said locked position.

7. A straight edge clamp comprising:
   an elongated body, said elongated body including at least two sections, and at least one connector for connecting said sections to form a unitary elongated body; said elongated body has opposed edges, a top and a bottom, and a main channel having sidewalls formed in said bottom,
   a clamping head and an end stop, said clamping head is mounted within said main channel a spaced distance from said end stop;
   said clamping head includes a locking mechanism to lock said clamping head with respect to said elongated body, wherein said locking mechanism engages said sidewalls in a locked position; said locking mechanism of said clamping head has a movable first jaw that is movable in a direction toward said end stop, between a released position and said locked position; whereby said bottom of said elongated body is adapted to be positioned against a work surface having sides and said clamping head is adapted to be positioned against one of the sides, and said locking mechanism is moved to a clamped position.

8. The straight edge clamp of claim 7, wherein an overall length of said elongated body is determined by a number of sections attached together by said at least one connector.

9. The straight edge clamp of claim 8, wherein said locking mechanism of said clamping head includes a movable locking member that moves between a locked and unlocked position.

10. The straight edge clamp of claim 9, wherein said movable locking member has engagement surfaces adapted to engage the elongated body.

11. The straight edge clamp of claim 10, wherein said engagement surface engage said sidewalls in said locked position.

12. The straight edge clamp of claim 11, wherein said clamping head includes at least one clamp pad mounted adjacent said first jaw, said first jaw being moveable with respect to said at least one clamp pad to move said at least one clamp pad into engagement with said elongated body to said locked position.

13. The straight edge clamp of claim 12, wherein said first jaw being movable with respect to said at least one clamp pad to move said at least one clamp pad into engagement with at least one of said sidewalls to said locked position.

14. The straight edge clamp of claim 13, wherein said at least one clamp pad includes at least one side wall extending at an acute angle with respect to a longitudinal center line of said elongated body.

15. The straight edge clamp of claim 14, further including a pair of clamp pads mounted adjacent said first jaw, said first jaw being moveable with respect to said clamp pads to move said clamp pads into engagement with said elongated body to said locked position.

* * * * *

UNITED STATES PATENT AND TRADEMARK OFFICE
CERTIFICATE OF CORRECTION

PATENT NO. : 9,815,177 B2  
APPLICATION NO. : 14/629677  
DATED : November 14, 2017  
INVENTOR(S) : Michael Ursell, Garry Favel and Tsvi Hershkovich Page 1 of 1

It is certified that error appears in the above-identified patent and that said Letters Patent is hereby corrected as shown below:

In the Claims

Column 5, Lines 62-65:
Delete "4. The straight edge of claim 3 , wherein said first jaw being moveable with respect to said at least one clamp pad into engagement with at least one of said sidewalls to said locked position"
Insert --"4. The straight edge clamp of claim 3, wherein said first jaw being moveable with respect to said at least one clamp pad to move said at least one clamp pad into engagement with at least one of said sidewalls to said locked position"--

Column 6, Line 44:
Delete "engagement surface engage said sidewalls in said locked"
Insert --"engagement surfaces engage said sidewalls in said locked"--

Signed and Sealed this  
Ninth Day of July, 2019

Andrei Iancu  
*Director of the United States Patent and Trademark Office*